United States Patent [19]

Inoue et al.

[11] Patent Number: 5,588,144
[45] Date of Patent: Dec. 24, 1996

[54] STORAGE SYSTEM HAVING A BUS COMMON TO A PLURALITY OF KINDS OF GROUPS OF PACKAGES

[75] Inventors: Mitsuru Inoue, Odawara; Hiroyuki Kurosawa, Hiratsuka, both of Japan

[73] Assignee: Hitachi, Ltd., Tokyo, Japan

[21] Appl. No.: 346,440

[22] Filed: Nov. 29, 1994

[30] Foreign Application Priority Data

Dec. 3, 1993 [JP] Japan ................... 5-303775

[51] Int. Cl.$^6$ ................................. G06F 1/14
[52] U.S. Cl. ................................. 395/555
[58] Field of Search ............... 395/550, 182.05, 395/282, 283

[56] References Cited

U.S. PATENT DOCUMENTS

| | | | |
|---|---|---|---|
| 4,870,643 | 9/1989 | Bultman et al. | 371/11.1 |
| 5,077,736 | 12/1991 | Dunphy, Jr. et al. | 371/10.1 |
| 5,423,046 | 6/1995 | Nunnelley et al. | 395/750 |
| 5,430,855 | 7/1995 | Walsh et al. | 395/275 |

FOREIGN PATENT DOCUMENTS 3-266011A 11/1991 Japan.
5-175675A 7/1993 Japan.

*Primary Examiner*—Thomas M. Heckler
*Assistant Examiner*—Dennis M. Butler
*Attorney, Agent, or Firm*—Kenyon & Kenyon

[57] ABSTRACT

The host adaptor packages 4 and the disk adaptor packages 6 which constitute the magnetic disk subsystem 1 are connected to the common bus 3 consisting of a data bus, a control bus, and a power line in the hot replacement ready state. The packages 4 and 6 have the control means 11 and the clock generator 14 and when a failure occurs in respective packages, the package replace controller 13 mounted in the control means 11 executes the blocking processing for the bus driver 15 and the clock generator 14. If this occurs, the clock generator 14 enters the stopped state, so that the circuit in the package enters the reset state and the package function is stopped, that is, the package enters the blocked state. As a result, hot replacement of the closed package can be executed without affecting the operation of the system.

10 Claims, 5 Drawing Sheets

5,588,144

STORAGE SYSTEM HAVING A BUS COMMON TO A PLURALITY OF KINDS OF GROUPS OF PACKAGES

BACKGROUND OF THE INVENTION

The present invention relates to a storage system including a common bus and a plurality of kinds of groups of packages which can be maintained without system power being turned off when a failed packaged is replaced and more particularly to a magnetic disk subsystem in which each package can be replaced for the common bus as the system is kept operable or hot.

In a computer system which is used for plant control or a financial system at present, non stop operation thereof is required. However, in a conventional computer system, when an error occurs in a part of the system, it is necessary to turn the system power off at least once so as to execute a recovery operation. To run the system nonstop, it is necessary to replace or maintain the part where an error occurs without the power of system being turned off.

There is an application regarding the hot replacement art for realizing such nonstop maintenance. Japanese Patent Application Laid-Open No. Heisei 5-175678, discloses an electronic device having a plurality of packages connected to a common bus, a controller installed outside the packages controls a bus buffer which is a connection circuit of the packages and common bus at the time of replacement of the packages and separates the packages logically from the common bus. Concretely, the art makes the impedance of the connection part of the bus buffer and common bus high.

To run a computer system nonstop, it is effective to use an art for enhancing the reliability of the whole system, that is, to use a fault tolerance system which comprises a plurality of redundant systems. Japanese Patent Application Laid-Open No. Heisei 3-266011 discloses such prior art, namely a system consisting of a plurality of redundant systems in which the parts other than the interfaces of the redundant systems are operated by independent clocks for each redundant system.

The electronic device indicated in Japanese Patent Application Laid-Open No. Heisei 5-175675 controls hot replacement and diagnosis of a plurality of packages intensively by a specific controller in the device. As a result, when a failure occurs in the controller, the system cannot be maintained nonstop. Only an art for separating the bus buffer logically from the common bus, that is, an art for separating the packages from a data system bus for transmitting data is indicated. Therefore, the effect on the whole system is not taken into account.

In Japanese Patent Application Laid-Open No. Heisei 3-266011, a system which allows an operation by an independent clock for each redundant system is indicated. However, replacement of each redundant system during running of the system without affecting the operation of the system is not taken into account.

SUMMARY OF THE INVENTION

The present invention provides a storage system including a plurality of packages which share a bus and can be hot-replaced, wherein hot replacement of the packages can be executed without affecting the operation of the system.

The present invention also provides a magnetic disk subsystem, wherein each package is detachably mounted to the common bus and can be replaced without affecting the other packages.

The storage system of the present invention has a plurality of host interface logic devices connected to a host computer constituting an interface to the host device, a storage device for storing data, a plurality of logical devices connected to the storage device constituting an interface to the aforementioned storage means, and cache memory devices for temporarily storing data transmitted between the aforementioned host interface logic devices and the aforementioned storage device interface logic. These logical devices connected to the host device, logic devices comprise respective packages which are connected to a common bus for connecting these logic devices to each other and each of the packages has a clock circuit for supplying a clock to the circuit therein and a control means for executing the blocking processing by stopping the supply of the clock to the circuit. Each package is removably connected with the common bus.

DETAILED DESCRIPTION

The present invention will be explained in detail hereunder using an embodiment.

Figure 1:
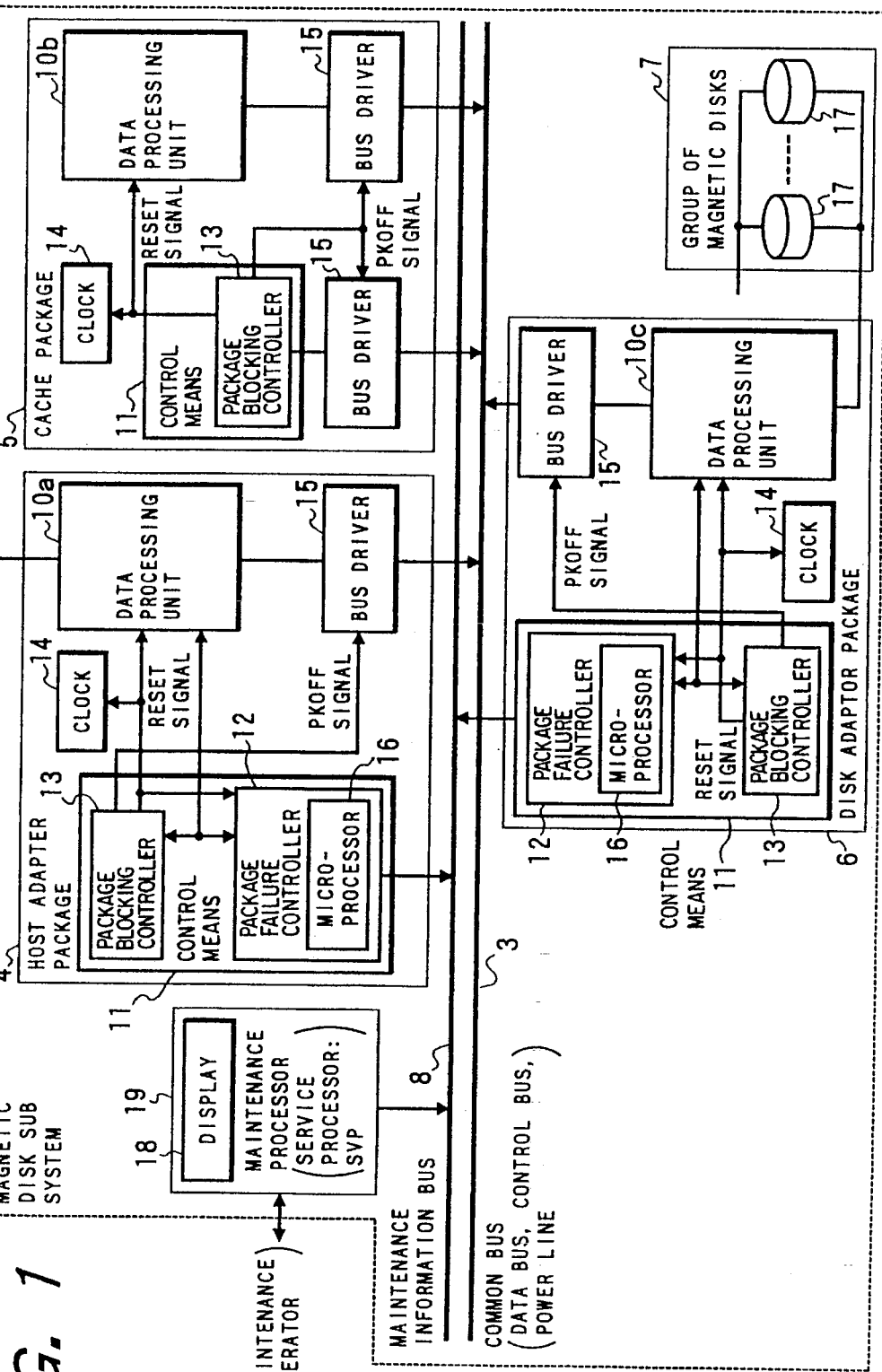
FIG. 1 is a drawing disclosing a principle of the present invention.

FIG. 1 is a system block diagram of a storage system which will be explained in this embodiment. In this embodiment, a magnetic disk is used as a storage medium. However, other storage media may be used. A storage system using a magnetic disk as a storage medium, that is, a magnetic disk subsystem 1 includes a common bus 3 and a host adaptor package 4, a cache package 5, a disk adaptor package 6, and a service processor 9 (hereinafter referred to as an SVP 9) which are connected to the common bus 3.

Figure 2:
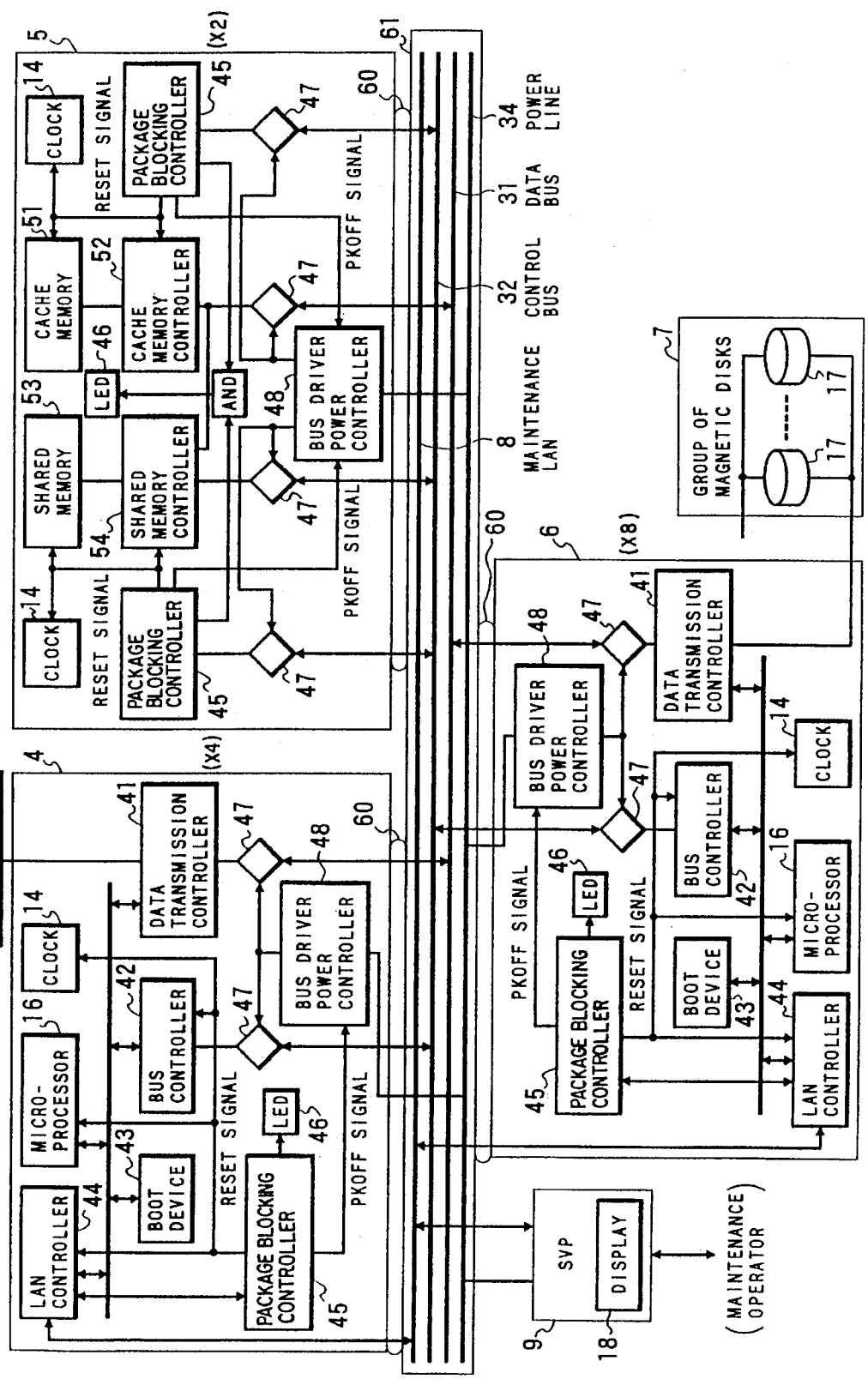
FIG. 2 is a system configuration diagram of an embodiment of the present invention.

The common bus 3 comprises a data bus, a control bus, and a power line as shown in FIG. 2.

The host adaptor package 4 is an interface with a host computer 2. The host adaptor package 4 has a data processing unit 10a for processing data, a bus driver 15 which is connected to the data processing unit 10a and is an interface to the host adaptor package 4 for the common bus 3, a control means 11 for controlling data transmission thereof, and a clock generator 14 for generating an operation clock signal for each package. The control means 11 has a package failure controller 12 for reporting the package operation status to the SVP 9 via a maintenance information bus 8 and a package blocking controller 13 for instructing the package blocking processing in preparation for removal of a failed package by an instruction of the package failure controller 12 and for instructing initialization of a newly inserted package.

The package failure controller 12 has a microprocessor 16 (hereinafter referred to as an MP 16). The package failure controller 12 monitors the operation status of each package.

When a failure occurs in a package, for example, an error occurs in data communication to the other package, the package failure controller 12 instructs blocking of the package to the package blocking controller 13. When blocking of the faulty package is instructed by the package failure controller 12, the package blocking controller 13 sends a PKOFF (Package OFF) signal to the bus driver 15 and a reset signal to the clock generator 14 and the data processing unit 10a and executes the blocking processing for the package 4. When the bus driver 15 receives the PKOFF signal, it enters the high impedance state for the common bus 3 and the package 4 is separated logically from the common bus 3. When at least the clock generator 14 enters the blocked state, the circuits in the package enter the reset state and the package function is stopped, that is, the package enters the blocked state. When the package enters the blocked state, the power consumption of the package is reduced. By doing this, when the package 4 is removed, since the bus driver 15 is in the high impedance state for the common bus 3, it will not generate noise to the data bus and control bus of the common bus 3. Since the power consumption of the package is also reduced, the bus driver will not generate noise to the power line of the common bus. Therefore, in a magnetic disk subsystem to which the present invention is applied, a package can be removed in the state that the effect on other packages connected via the common bus 3 is reduced.

The package failure controller 12 also detects a failure in the other package which responds via the common bus 3. The package failure controller 12 also can instruct blocking processing for the other package in which a failure is detected.

The cache package 5 which has package failure controller 12 includes a data processing unit 10b, a control means 11' having the package blocking controller 13, the clock generator 14, and the bus driver 15. The control means 11' has package failure controller 12 unlike the control means 11 in the host adaptor package or the disk adaptor package. Therefore, the blocking processing for the package 5 is executed by the package failure controller 12 of the other kind of package via the common bus.

The disk adaptor package 6 has a configuration which is almost the same as that of the host adaptor package 4. However, a data processing unit 10c of the disk adaptor package 6 is connected to the bus driver 15 and a group of magnetic disks 7. The data processing unit 10c which is not shown in the drawing can be connected to a plurality of groups of magnetic disks 7. The group of magnetic disks 7 has a plurality of magnetic disk units 17. The magnetic disk units 17 are connected to the data processing unit 10c in parallel with each other. The disk adaptor package 6 has a package failure controller 12 in the same way as with the host adaptor package 4, so that it for itself can shift to the blocked state.

For a package which is newly inserted into the subsystem, a self diagnosis is executed by a package failure controller 12. This package is incorporated into the subsystem by an instruction of the SVP 9.

A magnetic disk subsystem to which the present invention is applied maintains and replaces a package which operates normally, so that the magnetic disk subsystem instructs blocking to the package failure controller 12 of a package to be maintained by operating the SVP 9. The SVP 9 is equipped with a display 18 and an input means which is not shown in the drawing. When a package to be maintained does not have a package failure controller 12, the blocking processing is executed for the package to be maintained via the package failure controller 12 of a package which is not to be maintained.

As mentioned above, in a magnetic disk subsystem to which the present invention is applied, package failure monitoring and blocking processing are executed for each package. Therefore, the system can realize its nonstop maintenance.

A magnetic disk subsystem to which the present invention is applied has a clock generator 14 for each package. Therefore, the clock, that is, the intra-package reference frequency is supplied to each package. Accordingly, the clock signal supplied to each package will not be interrupted by blocking of the other packages. As a result, the whole subsystem will not be stopped by a failure in a package.

Furthermore, the other package which confirmed blocking of the package informs the SVP 9 of blocking of the package via the maintenance information bus 8. To instruct display of the blocked package on the display 18 of the SVP 9, the SVP 9 can monitor an occurrence of a failure during package replacement and prevent incorrect package removal.

FIG. 2 is a configuration diagram of a magnetic disk subsystem which is an embodiment of the present invention. FIG. 2 shows a more detailed constitution of the storage system shown in FIG. 1.

In this embodiment, there are four host adaptor packages 4 (as shown by symbol "X4". Each host adaptor package controls data transmission between the host computer and a data bus 31. The host adaptor package 4 includes a data transmission controller 41 having a data transmission control function for the data bus 31, a bus controller 42 for transmitting control information with a cache package 5 via a control bus 32, a clock generator 14 for supplying a clock to the circuits in the host adaptor package 4 via a supply bus which is not shown in the drawing, a microprocessor 16 (hereinafter called an MP 16) for receiving a data transmission request from the host computer and controlling (data transmission and failure monitoring) the host adaptor package 4, a LAN controller 44 for controlling communication with a maintenance LAN, a boot device 43 for storing the control program of the microprocessor which is a rewritable memory, for example, such as a flash ROM, a package blocking controller 45 for blocking a package which is in preparation for removal of the host adaptor package 4 by an instruction of the MP 16, that is, for stopping the package function, a LED 46 for lighting so as to indicate that the host adaptor package 4 is in the closed state, a bus driver 47, a bus driver power controller 48 for controlling the power source of the bus driver 47 during replacement of the host adaptor package 4, and a main edge connector 60 corresponding to hot replacement for connecting the host adaptor package 4 and a main back plane 61. There are eight (8) disk adaptor packages 6 in the subsystem of this embodiment (as shown by the symbol "X8"). Each disk adaptor package has a configuration which is almost the same as that of the host adaptor package 4. The disk adaptor package 6 is different from the host adaptor package 4 in that the data transmission controller 41 executes data transmission between the data bus 31 and the group of magnetic disks 7 and has a data transmission control function for the data bus 31 and the group of magnetic disks. However, the function of each of the bus controller 42, the clock generator 14, the MP 16, the LAN controller 44, the boot device 43, the package blocking controller 45, the LED 46, the bus driver 47, the bus driver power controller 48, and the main edge connector 60 of the disk adaptor package 6 is the same as that of the host adaptor package 4.

The cache package 5 can be accessed commonly from the MP 16 of each adaptor. The cache package 5 comprises a shared memory 53 for storing various types of management information on the status and operation of each package, a shared memory controller 54 for transmitting information between the cache memory and each adaptor via the data bus 31, a cache memory 51 which exists between the host adaptor package 4 and the disk adaptor package 6 for temporarily storing data to be transmitted between them, a cache memory controller 52 for transmitting information between the cache memory and each package via the data bus 31, a package blocking controller 45 for closing a package in preparation for removal of a package by an instruction of the MP of the other package, a LED 46, a bus driver 47, a clock generator 14, and a bus driver power controller 48. When the contents of the shared memory 53 are lost, the subsystem cannot be operated. Therefore, to run the subsystem nonstop, it is necessary to duplicate the cache package 5 in preparation for replacement of the cache package 5. Therefore, the subsystem has two cache packages (as shown by symbol "X2") 5 for storing the same information.

Figure 3:
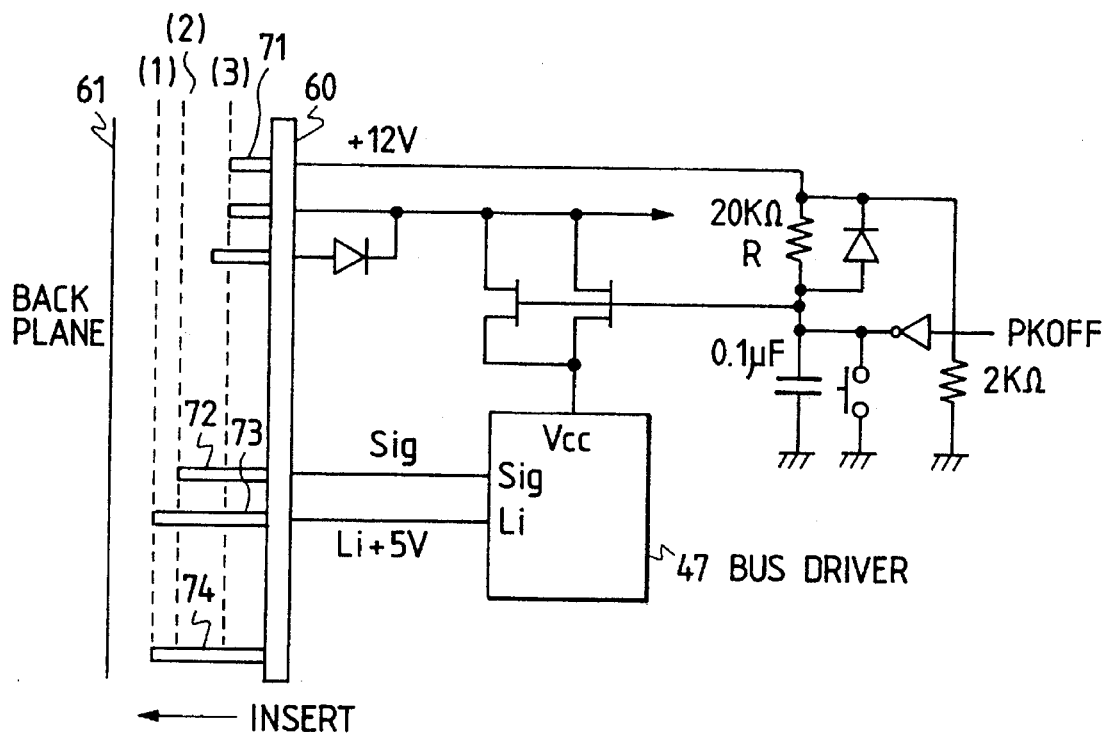
FIG. 3 is drawings showing the configuration of the connectors and bus driver power controller and the operation timing for package replacement respectively.
Figure 3:
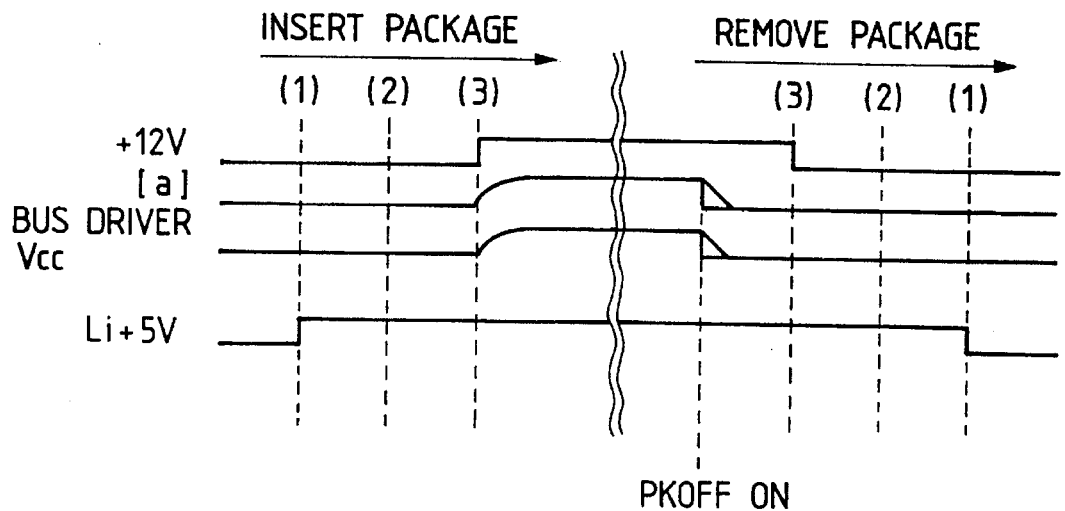

FIGS. 3A and 3B show the constitutions of the main edge connector 60 and the bus driver power controller 48 and the operation timing for package replacement respectively. The pins of the main edge connector 60 are a general power pin 71 for supplying the package operation power, a signal pin 72 for connecting an output signal of the bus driver and the data bus or control bus, a bus driver bias signal pin 73 for giving a bias signal to the bus driver, and a ground pin 74. Hereafter, the data bus 31 and the control bus 32 to which the signal pin 72 is connected are referred to as a signal bus for explanation.

The bus driver 47 has a characteristic that when a bias signal (Li) is given, the output signal thereof is biased and the capacitance of the output signal pin is reduced. When the power source (Vcc) is not connected, the output signal pin of the bus driver 47 is in the high impedance state.

When a package is inserted, the pins of the main edge connector 16 are connected to the back plane in the order of (1) the ground pin 74 and the bus driver bias signal pin 73, (2) the signal pin 72, and (3) the general power pin 71. As a result, the output signal of the bus driver 47 when the signal pin 72 is connected is biased. Therefore, the potential of the signal pin 72 which is an output pin of the bus driver is close to the potential of the signal bus of the back plane. Furthermore, since the capacitance of the signal pin 72 is already low, an occurrence of noise due to leading-in of a current from the signal bus to the signal pin 72 can be suppressed. Since the general power pin 71 is connected last, when the signal pin 72 is connected, the signal pin 72 is in the high impedance state. Therefore, the signal pin 72 will not adversely affect the signal bus when it is connected.

When a package is removed, the pins of the main edge connector 16 are disconnected in the order of (1) the general power pin 71, (2) the signal pin 72, and (3) the ground pin 74 and the bus driver bias signal pin 73. Before removing a package, the PKOFF signal is issued by the package blocking controller. As a result, the power supply to the bus driver 47 is interrupted and the output pin thereof enters the high impedance state. Therefore, when the signal pin 72 is separated from the signal bus, the signal pin 72 is in the high impedance state, and the potential thereof is close to the potential of the signal bus by the bias signal (Li), and the capacitance is low. As a result, the effect of noise on the signal bus by the signal pin 72 at the time of removal is suppressed.

Figure 4:
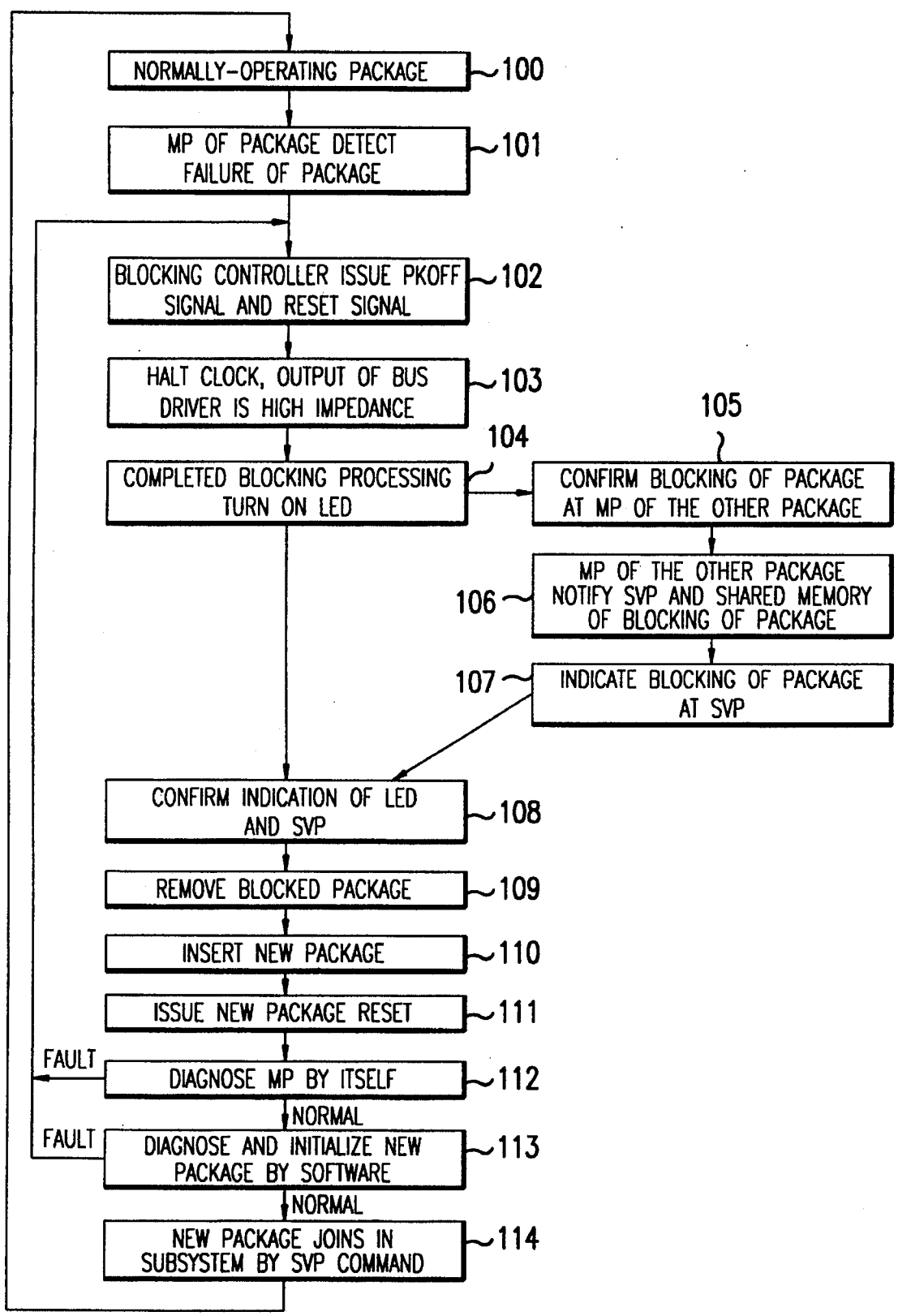
FIG. 4 is a flow chart showing the procedure for replacing a package in which a failure occurs in the system operation state.

FIG. 4 is a flow chart showing the procedure when a package (host adaptor package 4, disk adaptor package 6) having an MP 16 in which a failure occurs is replaced in the system operation state. The package hot replacement processing procedure with an MP in the case of failure replacement will be explained hereunder with reference to FIG. 4.

When a failure occurs in a package with an MP, the MP 16 in the faulty package detects the failure (Step 101). By an instruction of the MP 16 which detects the failure, the package blocking controller 45 issues a reset signal and a PKOFF signal to the circuit in the package (Step 102). Since the clock is halted by this reset signal, the operation of the circuit of the package is stopped and the power consumption of the package is reduced (Step 103). Since the bus driver power controller 48 which receives the PKOFF signal stops the power supply to the bus driver 47, the output of the bus driver 47 enters the high impedance state. Furthermore, the package blocking controller 45 turns the LED 46 on so as to inform a customer engineer of completion of blocking of package. Now the preparation for package removal is completed (Step 104).

On the other hand, a package which is operating normally confirms that the faulty package is blocked via the control bus 32 (Step 105). The package informs the SVP of blocking of the faulty package via the maintenance LAN 8 and writes the information of blocked package into the shared memory 53 via the control bus 32 (Step 106). The SVP which is informed of blocking of the package displays blocking of the package on the display 21 (Step 107). The other packages can know blocking of the package when they access the shared memory 53.

The customer engineer confirms lighting of the LED 46 and display of the SVP 9 (Step 108) and then removes the blocked package (Step 109). In this case, as mentioned above, the power consumption of the package to be removed is reduced by the package close controller 45. As a result, the power pin of the main edge connector 60 is prevented from damage due to an overcurrent when a package is removed. The output of the bus driver is also in the high impedance state. As a result, the effect of noise on the signal bus when a package is removed is suppressed and the operation of the whole system will not be affected.

Next, a new package is inserted by a customer engineer (Step 110). When the signal pin 72 of the main edge connector 60 is connected, the output signal of the bus driver 47 is biased. As a result, the potential of the signal pin 72 is close to the potential of the signal bus of the back plane. Furthermore, since the capacitance of the signal pin 72 is already low, an occurrence of noise in the signal pin 72 from the signal bus is suppressed. When the general power pin 71 is connected, the signal pin 72 is in the high impedance state. Therefore, the signal pin 72 will not affect the signal bus.

When the package blocking controller 45 detects connection of the general power pin 71, a reset signal is issued to the new package (Step 111) and the MP 16 of the new package starts operation. The MP 16 of the new package makes a self diagnosis (Step 112), operates according to the control program of the boot device 43, and diagnoses and initializes the new package (Step 113). When an error is detected at the time of self-diagnosis at Steps 112 and 113, the package is blocked and replaced once again (Step 102). When the result of self-diagnosis shows no error, the new package is incorporated into the subsystem by an instruction of the SVP 9 (Step 114) and starts the normal operation (Step 100).

Figure 5:
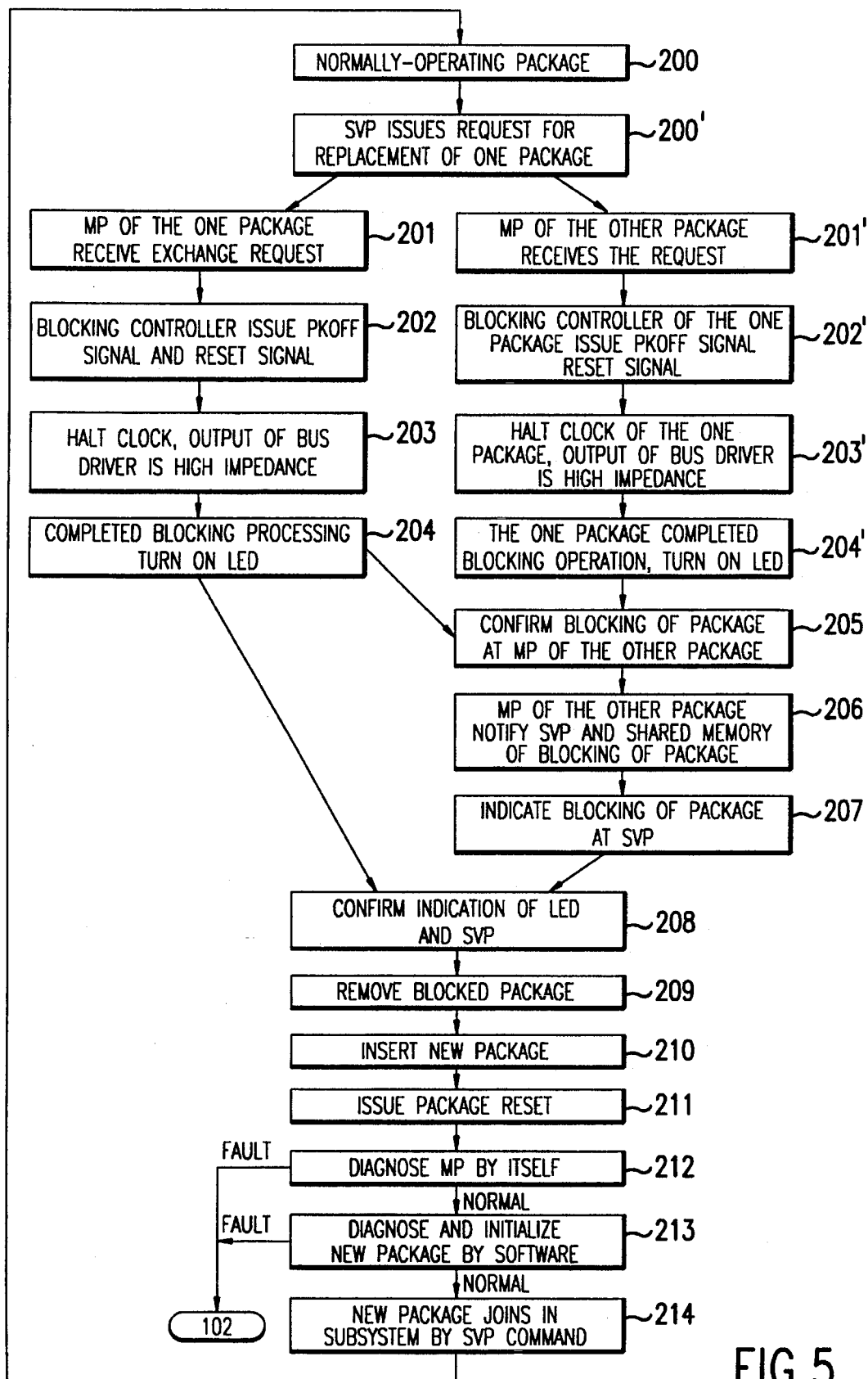
FIG. 5 is a flow chart showing the procedure for replacing packages for maintenance in the system operation state.

FIG. 5 is a flow chart showing the procedure when a package with an MP is replaced in the system operation state so as to maintain and replace it. The hot replacement processing procedure for a package with an MP in the case of maintenance and replacement will be explained hereunder with reference to FIG. 5.

The SVP 9 issues a maintenance and replacement request by operation of the customer engineer (step 200'). There are cases available that the maintenance and replacement request is issued to the MP 16 of a package to be maintained from the SVP 9 via the maintenance LAN 8 (Step 201) and the maintenance and replacement request is issued to the MP 16 of a package not to be maintained via the control bus 32 (Step 201'). In the former case, the MP 16 of the package to be maintained instructs the blocking processing to the package blocking controller 45, and the blocking processing is executed by the package close controller 45 (Steps 201 to 204), and the other package confirms blocking of the package to be maintained (Step 205). In the latter case, the MP 16 of the package not to be maintained instructs the blocking processing to the package blocking controller 45 of the package to be maintained, and the blocking processing is executed by the package blocking controller 45 of the package to be maintained (Steps 201' to 204'), and the package not to be maintained confirms blocking of the package to be maintained (Step 205). Next, hot replacement of the package is executed according to the same procedure (Steps 206 to 214) as that for replacement of a faulty package.

A failure of a package (cache package 5) having no MP is detected by the MP 16 of a package with an MP via the control bus 32. The MP 16 of a package with an MP receives a maintenance and replacement request for a package with no MP and controls maintenance and replacement of the package with no MP via control bus 32 and data bus 31. The hot replacement processing for a package with no MP is executed according to the same procedure as that for a package with an MP. However, the blocking processing for the package blocking controller of a package with no MP which is to be removed or inserted is instructed by the MP 16 of a package with an MP via the control bus 32.

According to this embodiment, in a magnetic disk subsystem including a plurality of packages which can be hotreplaced for the common bus, an optional package can be hotreplaced without affecting the operation of the other packages in the system.

According to this embodiment, by blocking a package by the blocking controller, the power consumption of the package is reduced and the effect on the power bus at the time of replacement is suppressed, so that the connector 60 is prevented from damage.

According to this embodiment, the clock signal is supplied from each package, so that the whole subsystem will not be stopped due to a failure of a package, accordingly the failure resistance of the whole subsystem increases.

In this embodiment, since a blocked package can be confirmed easily, the whole subsystem will not be damaged due to misremoval. Since this embodiment has a plurality of confirmation means, a failure of a confirmation means mentioned above can be discovered easily.

By still another operation of the present invention, a newly inserted package makes a self-diagnosis independently and is incorporated into the subsystem by an instruction of the SVP 9, so that the subsystem can operate regardless of insertion of the new package and self-diagnosis thereof. As mentioned above, according to the present invention, in a storage system consisting of a plurality of packages which share a bus and can be hot-replaced, the packages can be hot-replaced without affecting the operation in the system.

What is claimed is:

1. A storage system for connection to a host computer, the system having a common bus and comprising:
    a plurality of host interface logic devices to be connected to the host computer and constituting an interface to the host computer; and
    a storage device for storing data;
    a plurality of storage device interface logic devices connected to the storage device each constituting an interface to said storage device; and
    a plurality of cache memory devices each for temporarily storing data transmitted between said host interface logic devices and said storage interface logic devices;
    wherein each of said plurality of host interface logic devices, said plurality of storage device interface logic devices, and said cache memory devices constitutes a package which is connected to said common bus respectively, the common bus connecting these devices to each other, and each said package has an independently operable clock circuit for supplying a clock to the circuit therein and a control means for executing a blocking processing by stopping the supply of said clock to said circuit therein, and each package is detachably mounted to the common bus.

2. A storage system according to claim 1, wherein said control means detects a failure which occurs in said packages and executes the blocking processing.

3. A storage system according to claim 1, wherein said control means detects a failure of one of the other packages and executes the blocking processing for said one of the other packages.

4. A magnetic disk subsystem having a common bus comprising:
    a plurality of host adaptors which are to be connected to a host computer and which are to transmit data with said host computer;
    magnetic disk units for storing data;
    a plurality of disk adaptors which are connected to said magnetic disk units and transmit data with said magnetic disk units; and
    a plurality of cache memory adaptors each for temporarily storing data transmitted between said host adaptors and said disk adaptors, wherein each of said plurality of host adaptors, said plurality of disk adaptors, and said cache memory adaptors constitutes a package which is connected to said common bus by connectors respectively which bus connects these devices to each other, and each of said packages has a clock circuit for supplying a clock to the circuit therein and a control means for executing the blocking processing by stopping the supply of said clock to said circuit therein, and each package is detachably mounted to the common bus.

5. A magnetic disk subsystem according to claim 4, wherein said control means detects a failure which occurs in said packages and executes the blocking processing.

6. A magnetic disk subsystem according to claim 4, wherein said control medium detects a failure of one of the other packages and executes the blocking processing for said one of the other packages.

7. A storage system for connection to a host computer, the system having a common bus and comprising:
    a plurality of host interface logic devices to be connected to a host computer and constituting an interface to the host computer;

a storage device for storing data;

a plurality of storage device interface logic devices each connected to the storage device and constituting an interface to said storage device; and a plurality of cache memory devices for temporarily storing data transmitted between said host interface logic devices and said storage interface logic devices;

wherein each of said plurality of host interface logic devices, said plurality of storage interface logic devices, and said plurality of cache memory devices constitute a package which is connected to said common bus respectively which connects these devices to each other, and each of said packages has an independent operable clock circuit for supplying a clock to a circuit therein and a control means for executing the blocking processing by stopping the supply of said clock to said therein circuit, and each package is detachably mounted to the common bus, and said system has a maintenance means for monitoring the operation status of said packages and maintaining a package in which a failure occurs.

8. A storage system according to claim 7, wherein said maintenance means allows said control means to execute the blocking processing.

9. A storage system according to claim 8, wherein said control means detects a failure which occurs in said packages and executes the blocking processing.

10. A storage system according to claim 8, wherein said control means detects a failure of the other package and executes the blocking processing for said other package.

* * * * *